United States Patent
Du et al.

(10) Patent No.: US 9,298,909 B2
(45) Date of Patent: Mar. 29, 2016

(54) DETECTING STATUS OF AN APPLICATION PROGRAM RUNNING IN A DEVICE

(75) Inventors: Shyundii Sterling Du, Shanghai (CN); Zhibin Hua, Shenzhen (CN); Jun Li, Wuhan (CN)

(73) Assignee: O2Micro, Inc., Santa Clara, CA (US)

( * ) Notice: Subject to any disclaimer, the term of this patent is extended or adjusted under 35 U.S.C. 154(b) by 1086 days.

(21) Appl. No.: 13/370,116

(22) Filed: Feb. 9, 2012

(65) Prior Publication Data

US 2013/0179973 A1 Jul. 11, 2013

(51) Int. Cl.
*G06F 21/52* (2013.01)
*G06F 21/56* (2013.01)
*G06F 21/81* (2013.01)

(52) U.S. Cl.
CPC ............. *G06F 21/52* (2013.01); *G06F 21/56* (2013.01); *G06F 21/81* (2013.01)

(58) Field of Classification Search
CPC ... H04L 63/145; H04L 63/1416; G06F 21/56; G06F 21/566
See application file for complete search history.

(56) References Cited

U.S. PATENT DOCUMENTS

| | | | | |
|---|---|---|---|---|
| 5,822,517 | A * | 10/1998 | Dotan | 726/22 |
| 7,743,419 | B1 * | 6/2010 | Mashevsky et al. | 726/24 |
| 7,818,739 | B2 * | 10/2010 | Cox et al. | 717/171 |
| 2004/0193896 | A1 * | 9/2004 | Kaneko | 713/188 |
| 2005/0046390 | A1 | 3/2005 | Kimura | |
| 2007/0240217 | A1 | 10/2007 | Tuvell et al. | |
| 2008/0276111 | A1 | 11/2008 | Jacoby et al. | |
| 2010/0174928 | A1 * | 7/2010 | Borghetti et al. | 713/320 |
| 2010/0313270 | A1 * | 12/2010 | Kim | G06F 1/28 726/24 |
| 2010/0331057 | A1 | 12/2010 | Tanaka | |
| 2011/0099433 | A1 | 4/2011 | Matsui et al. | |
| 2011/0109613 | A1 | 5/2011 | Asai et al. | |
| 2012/0134517 | A1 | 5/2012 | Sato | |
| 2012/0167218 | A1 * | 6/2012 | Poornachandran et al. | 726/24 |
| 2012/0240230 | A1 * | 9/2012 | Lee | G06F 21/564 726/24 |
| 2014/0173319 | A1 | 6/2014 | Zeng | |

FOREIGN PATENT DOCUMENTS

| | | |
|---|---|---|
| CN | 1780162 A | 5/2006 |
| CN | 101853166 A | 10/2010 |
| CN | 102306118 A | 1/2012 |
| JP | H03233629 A | 10/1991 |
| JP | H09128232 A | 5/1997 |

(Continued)

OTHER PUBLICATIONS

Hitoshi Nagasaka, et al., Optimization of electric power efficiency based on model in GPU, IPSJ SJG Technical Report 2010 (5), <CD-ROM>, Information Processing Society of Japan, Feb. 15, 2011, pp. 1 to 3.

(Continued)

*Primary Examiner* — Jaweed A Abbaszadeh
*Assistant Examiner* — Cheri Harrington

(57) ABSTRACT

A detecting system includes a sense terminal and detecting circuitry coupled to the sense terminal. The sense terminal receives an indicative signal indicative of a supply current of a power source. The detecting circuitry calculates variation in the supply current based on the indicative signal, estimates power consumption of an application program residing on a computer-readable medium according to the variation, and detects whether an abnormal condition occurs by comparing the estimated power consumption with a reference.

16 Claims, 5 Drawing Sheets

(56) References Cited

FOREIGN PATENT DOCUMENTS

| | | |
|---|---|---|
| JP | 2005080385 A | 3/2005 |
| JP | 2006350481 A | 12/2006 |
| JP | 2009181366 A | 8/2009 |
| JP | 2010134536 A | 6/2010 |
| JP | 2011095927 A | 5/2011 |
| JP | 2011145930 A | 7/2011 |
| JP | 2011186596 A | 9/2011 |
| TW | 201122520 A | 7/2011 |
| WO | 2010007913 A1 | 1/2010 |
| WO | 2011155106 A1 | 12/2011 |

OTHER PUBLICATIONS

Japanese Office Action dated Dec. 10, 2013 issued in corresponding Patent Application No. 2012-106588 (5 pages).

* cited by examiner

DETECTING STATUS OF AN APPLICATION PROGRAM RUNNING IN A DEVICE

RELATED APPLICATION

The present application claims priority to Patent Application No. 201210006791.X, filed on Jan. 10, 2012, with the State Intellectual Property Office of the People's Republic of China.

BACKGROUND

Detecting systems can be used in electronic devices, e.g., a computing device such as a desktop, a laptop, a smart phone, a palmtop, or a tablet computer, to detect an abnormal condition of the electronic devices. A conventional detecting system detects whether an electronic device contains a computer virus by checking all of the application programs running in the electronic device.

More specifically, the detecting system compares the code of each application program with code in a virus database, and checks whether the application programs contain a computer virus. If an application program contains code that is found in the virus database, the detecting system determines that the application program is infected with a computer virus. Each time to determine whether the application programs contain a computer virus, the detecting system compares the code of all the application programs running in the electronic device with the code in the virus database. Thus, the detecting process is relatively low efficient and high resource-consuming.

SUMMARY

In one embodiment, a detecting system includes a sense terminal and detecting circuitry coupled to the sense terminal. The sense terminal receives an indicative signal indicative of a supply current of a power source. The power source is operable for powering a device to run an application program residing on a computer-readable medium. The detecting circuitry calculates variation in the supply current based on the indicative signal, estimates power consumption of the application program according to the variation, and detects whether an abnormal condition occurs by comparing the estimated power consumption with a reference.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Figure 1A:
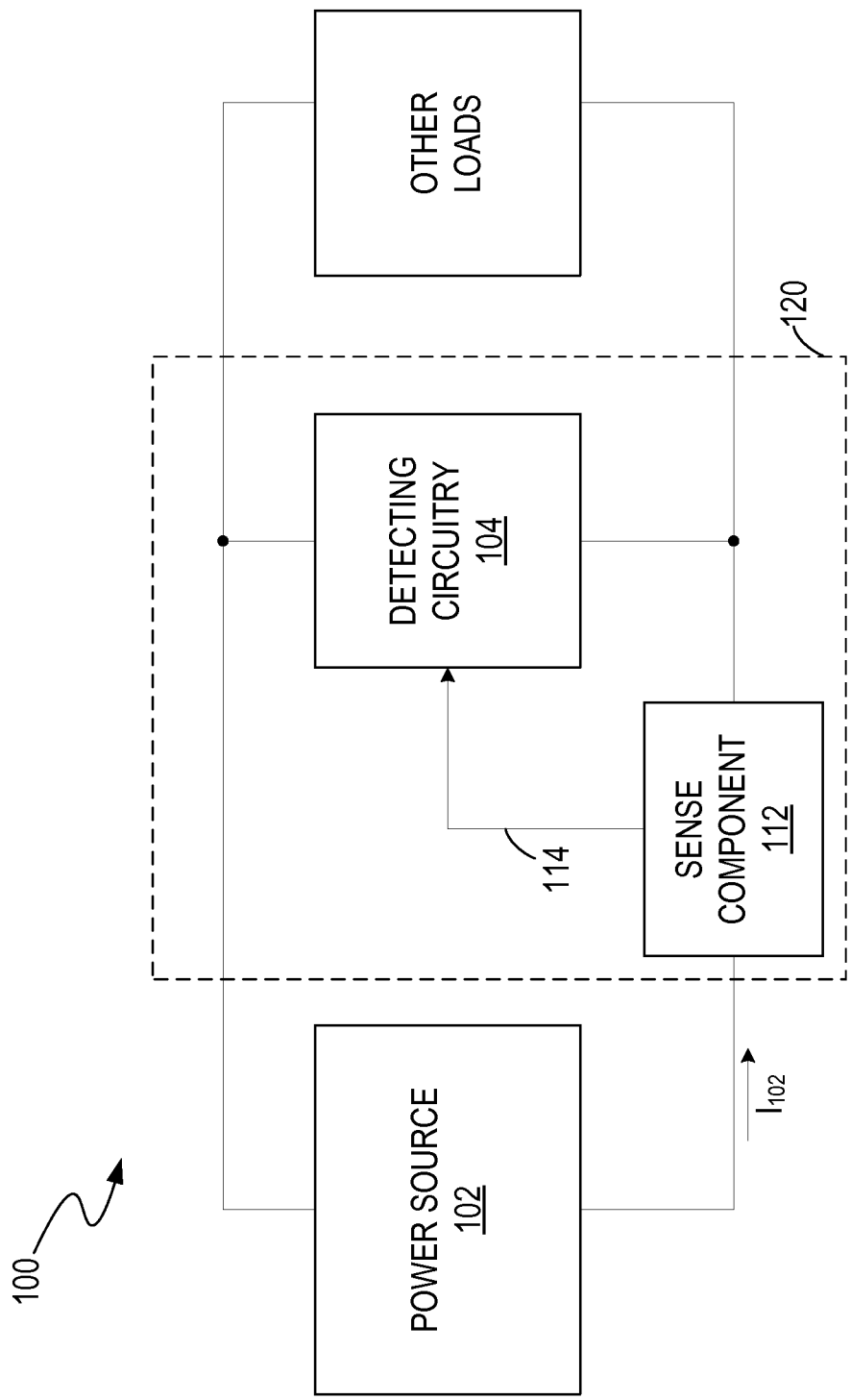
FIG. 1A illustrates a block diagram of an example of an electronic device, in accordance with one embodiment of the present invention.

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "calculating," "estimating," "detecting," "monitoring," "storing," "receiving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, the present invention provides a detecting system that monitors status of application programs running in an electronic device, and detects whether an abnormal condition occurs in the application programs by estimating power consumption of the application programs.

FIG. 1A illustrates a block diagram of an example of an electronic device 100, in accordance with one embodiment of the present invention. The electronic device 100 includes an operating system that supports application programs and acts as an intermediary between the application programs and hardware in the electronic device 100. For example, the electronic device 100 can be, but is not limited to, a desktop, a laptop, a smart phone, a palmtop, or a tablet computer. The electronic device 100 includes a power source 102 and a detecting system 120. In one embodiment, the power source 102 includes a rechargeable battery pack, such as lithium-ion battery, nickel-cadmium battery, lead-acid battery, solar battery, or the like. In another embodiment, the power source 102 includes an adapter. The power source 102 is operable for powering a processor, e.g., a central processing unit, of the electronic device 100 to run one or more application programs residing on a computer-readable medium in the electronic device 100. The power source 102 may also power other loads such as a display screen and communication interfaces of the electronic device 100. The detecting system 120 coupled to the power source 102 is operable for detecting whether an abnormal condition occurs. In one embodiment, an abnormal condition occurs if an application program is infected with a computer virus or other types of malicious software.

More specifically, the detecting system 120 includes a sense component 112 and detecting circuitry 104. The sense component 112, e.g., a resistor, is coupled in series to the power source 102. When the electronic device 100 runs one or more application programs, a supply current $I_{102}$ of the power source 102 flows through the sense component 112. The sense component 112 provides an indicative signal 114 indicative of the supply current $I_{102}$ of the power source 102 to the detecting circuitry 104. The detecting circuitry 104 receives the indicative signal 114 via a sense terminal. The detecting circuitry 104 is operable for estimating power consumption of an application program by calculating variation in the supply current $I_{102}$ based on the indicative signal 114, and operable for detecting whether an abnormal condition occurs by comparing the estimated power consumption with a reference $P_R$ corresponding to the application program. The reference $P_R$ indicates average power consumption of the corresponding application program when the application program operates under a normal condition.

Figure 1B:
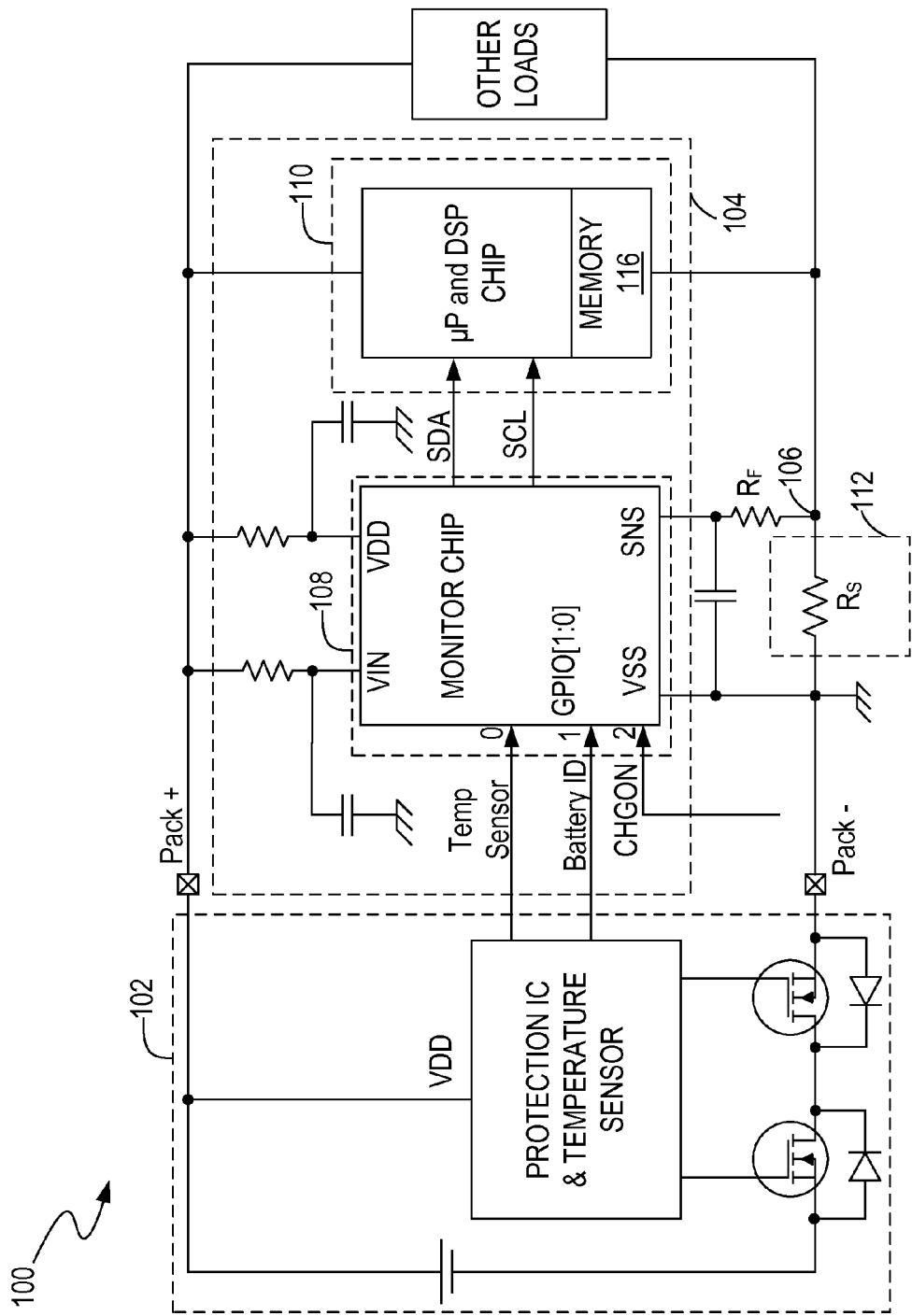
FIG. 1B illustrates a circuit diagram of an example of the electronic device in FIG. 1A, in accordance with one embodiment of the present invention.

FIG. 1B illustrates a circuit diagram of an example of the electronic device 100 in FIG. 1A, in accordance with one embodiment of the present invention. In the example of FIG. 1B, the detecting circuitry 104 includes a monitor 108 and a processor 110 (e.g., a microprocessor or a digital signal processor chip such as a CPU based on x86 or ARM platform). The detecting circuitry 104 can further include a computer-readable medium, e.g., a memory 116, to store computer-readable instructions executed by the processor 110. The memory 116 can be integrated inside or placed outside the processor 110. The monitor 108 is coupled to the processor 110 via an SDA (serial data) line and an SCL (serial clock) line. The power source 102 is coupled to the monitor 108. The sense component 112 is coupled in series to the processor 110, and is coupled to the monitor 108 via a sense terminal 106.

The power source 102 can power the processor 110 to run one or more application programs residing on the memory 116. If the number of running application programs increases, the supply current $I_{102}$ of the power source 102 that flows through the sense component 112 increases accordingly. In one embodiment, an increment of the supply current can be used to estimate power consumption of an application program. The sense component 112 provides an indicative signal 114 to the monitor 108 indicative of the supply current $I_{102}$ of the power source 102. The indicative signal 114 can be the voltage across the sense component 112.

The monitor 108 can monitor the voltage across the sense component 112 to monitor the supply current $I_{102}$ of the power source 102 and can store information indicative of the supply current $I_{102}$ in a storage unit, e.g., a register in the monitor 108. The processor 110, by executing computer-readable instructions stored in the memory 116, receives information indicative of the supply current $I_{102}$ from the storage unit, and calculates variation in the supply current $I_{102}$ based on the information indicative of the supply current $I_{102}$. In addition, the processor 110 estimates power consumption of the application program according to the variation in the supply current $I_{102}$, and detects whether an abnormal condition occurs by comparing the estimated power consumption with a reference $P_R$ corresponding to the application program.

In operation, in one embodiment, the monitor 108 receives the indicative signal 114, e.g., the voltage of the sense component 112 via the sense terminal 106, converts the indicative signal 114 to digital information indicative of the supply current $I_{102}$, and stores the digital information in the storage unit. The processor 110 receives the digital information of the supply current $I_{102}$ from the storage unit via the SDA line and the SCL line, and calculates the variation in the supply current $I_{102}$ based on the digital information. By way of example, the supply current $I_{102}$ of the power source 102 can have a first current level when an application program, e.g., referred to as "program APP1," is inactive, and can have a second current level when the program APP1 is active. If an application program is running in the electronic device 100, the application program is active; otherwise, the application program is inactive. The variation in the supply current $I_{102}$ of the power source 102, e.g., the difference between the first current level and the second current level, can be used to estimate the power consumption of the program APP1. More specifically, the processor 110 estimates the power consumption of the program APP1 by multiplying the variation in the supply current $I_{102}$ with the voltage of the power source 102. In another embodiment, the processor 110 calculates a first power consumption by multiplying the first current level with the voltage of the power source 102 when the program APP1 is inactive, calculates a second power consumption by multiplying the second current level with the voltage of the power source 102 when the program APP1 is active. The power consumption of the program APP1 depends on the difference between the first power consumption and the second power consumption.

The processor 110 detects whether an abnormal condition occurs by comparing the estimated power consumption with a reference $P_R$ corresponding to the program APP1. In one embodiment, the reference $P_R$ indicates average power consumption of the program APP1 when the electronic device 100 operates in a normal condition, e.g., in a healthy environment without computer viruses. In one embodiment, if a difference DIF between the estimated power consumption and the reference $P_R$ is greater than a predetermined threshold, the processor 110 provides an alert signal, e.g., an interrupt signal, indicating that an abnormal condition occurs. In one embodiment, an abnormal condition occurs if an application program is infected with a computer virus or other types of malicious software.

In response to the alert signal, the processor 110 can further run a detecting program residing on the memory 116, e.g., security software, to check the program APP1. By way of example, if the processor 110 of the detecting circuitry 104 detects that an abnormal condition occurs to the program APP1, the processor 110 executes a detecting program residing on the memory 116, to access a pre-determined virus database and to compare the code of the program APP1 with code in the pre-determined virus database, and to check whether the program APP1 contains a computer virus. If the detecting program determines that the program APP1 contains a computer virus, the processor 110 of the detecting circuitry 104 executes an anti-virus program residing on the memory 116 to remove the computer virus or uninstall the program APP1. If the program APP1 does not contain code that is matched to the code of a computer virus in the virus database, the processor 110 executes a self-checking program residing on the memory 116 to check whether the program APP1 contains a computer virus by comparing a current code length of the program APP1 with a pre-stored code length of the program APP1. The "current code length" means the length of the code of the program APP1 in a current moment. The "pre-stored code length" means the length of the code of the program APP1 that is previously determined in a normal condition, and is stored in the memory 116. If the current code length is equal to the pre-stored code length, then the self-checking program determines that the program APP1 does not contain a computer virus. If the current code length is different from the pre-stored code length, the detecting circuitry 104 determines that a new computer virus is found, and updates the virus database to include code of the new computer virus.

The reference $P_R$ corresponding to the program APP1 indicates an average level of power consumption of the program APP1. By way of example, in the normal condition, when the electronic device 100 runs the program APP1 for the first time, the processor 110 estimates power consumption POW1 of the program APP1, and stores the estimated power consumption POW1 in a storage element, e.g., a register, in the processor 110. The estimated power consumption POW1 can be used as the reference $P_R$ corresponding to the program APP1. In the normal condition, when the electronic device 100 runs the program APP1 for the second time, the processor 110 estimates power consumption POW2 of the program APP1 again. The reference $P_R$ corresponding to the program APP1 can be determined by an average of the estimated power consumption POW1 and POW2, e.g., the reference $P_R$ is equal to (POW1+POW2)/2. The processor 110 updates the reference $P_R$ in the storage element. Accordingly, when the electronic device 100 operates in the normal condition, each time when the processor 110 runs the program APP1, the processor 110 updates the reference $P_R$ corresponding to the program APP1 in the storage element by calculating an average level of a current power consumption of the program APP1 and the reference $P_R$ stored in the storage element. Advantageously, the processor 110 can obtain a more accurate reference $P_R$ for the program APP1.

In one embodiment, the processor 110 also detects whether an abnormal condition occurs by detecting power consumption of the detecting system 120 periodically. The processor 110 can detect whether an abnormal condition occurs by comparing a power consumption difference PD0 with a pre-defined threshold $P_{DTH}$. More specifically, the processor 110 estimates the power consumption of the detecting system 120 at a frequency $1/T_{DEC}$. For example, the processor 110 estimates the power consumption of the detecting system 120 at time $t_i$, time $(t_i+T_{DEC})$, time $(t_i+2*T_{DEC})$, etc. The processor 110 calculates the power consumption difference, e.g., referred to as PD1, between the power consumption at time $t_i$ and time $(t_i+T_{DEC})$. Similarly, the processor 110 calculates the power consumption difference, e.g., referred to as PD2, between the power consumption at time $(t_i+T_{DEC})$ and time $(t_i+2*T_{DEC})$. If the electronic device 100 operates in the normal condition, and if the electronic device 100 runs the same application programs at times $t_i$, $(t_i+T_{DEC})$ and $(t_i+2*T_{DEC})$, then the levels of the differences PD1 and PD2 are within a range, e.g., from $-P_{DTH}$ to $P_{DTH}$. If a difference PD0 between calculated levels of power consumption of the electronic device 100 at times $t_k$ and $(t_k+T_{DEC})$ is outside the range, e.g., from $-P_{DTH}$ to $P_{DTH}$, and if the processor 110 detects that the electronic device 100 runs the same application programs at times $t_i$, $(t_i+T_{DEC})$, $(t_i+2*T_{DEC})$, $t_k$ and $(t_k+T_{DEC})$, then the processor 110 provides an alert signal, e.g., an interrupt signal, indicating that an abnormal condition occurs. The abnormal condition can be caused by an invisible virus program running in the processor 110. The alert signal can activate a virus-scanning program residing on the memory 116 to scan the application programs running in the processor 110. If the difference PD0 between the calculated levels of power consumption of the electronic device 100 at times $t_k$ and $(t_k+T_{DEC})$ is within the range, e.g., from $-P_{DTH}$ to $P_{DTH}$, the electronic device 100 can be considered operating in a normal condition.

In one embodiment, the power source 102 is a battery. The processor 110 can calculate the remaining electric energy of the power source 102 and determine whether the power source 102 can power the electronic device 100 to run an application program APP2 residing on the memory 116 based on the remaining electric energy. If the remaining electric energy of the power source 102 is sufficient to run the application program APP2, the processor 108 can also estimate a duration of time $T_{RUN}$ for running the application program APP2.

For illustrative purposes, the invention is described in relation to two programs APP1 and APP2. However, the number of application programs can vary and the power source 102 can power the electronic device 100 to run other number of application programs.

In one embodiment, the remaining charge of the power source 102 can be obtained by coulomb counting using a counter chip in the monitor 108. The processor 110 estimates the remaining electric energy of the power source 102 by multiplying the remaining charge with the voltage of the power source 102. The processor 110 can convert the remaining electric energy of the power source 102 from Joule to Calorie by dividing the remaining electric energy by 4.186. Thus, the display screen can display the remaining energy of the power source 102 in the unit of Calorie. Additionally, the processor 110 can calculate electric energy $E_1$ consumed by an application program during a time period, e.g., one second, in the unit of Calorie. The electric energy $E_1$ can be displayed on the display screen. Furthermore, the processor 110 can count the running time of an application program from the activation of the application program to a present moment, and calculate electric energy $E_2$ consumed by the application program during the running time in the unit of Calorie. The electric energy $E_2$ can be displayed on the display screen.

Advantageously, the detecting system 120 can calculate power consumption of an active application program APP1 in the electronic device 100 to detect whether an abnormal condition occurs. If the detecting system 120 detects that an abnormal condition occurs to an application program, the detecting system 120 compares the code of such application program with code in the pre-determined virus database, and checks whether such application program is infected with a computer virus. Therefore, compared with the conventional detecting process which compares the code of all the application programs to the code in a virus database, the detecting process of the present invention is more efficient and consumes less resource. The detecting system 120 can also notify an end-user whether the remaining electric energy of the power source is sufficient to run another application program APP2. If the remaining electric energy of the power source is sufficient to run another application program APP2, the detecting system 120 can further estimate a time duration $T_{RUN}$ for running the application program APP2. Furthermore, the detecting system 120 can provide a user-friendly interface by displaying the remaining electric energy of the power source 102 and power consumption of one or more applications on a display screen, e.g., in the unit of Calorie.

Figure 2:
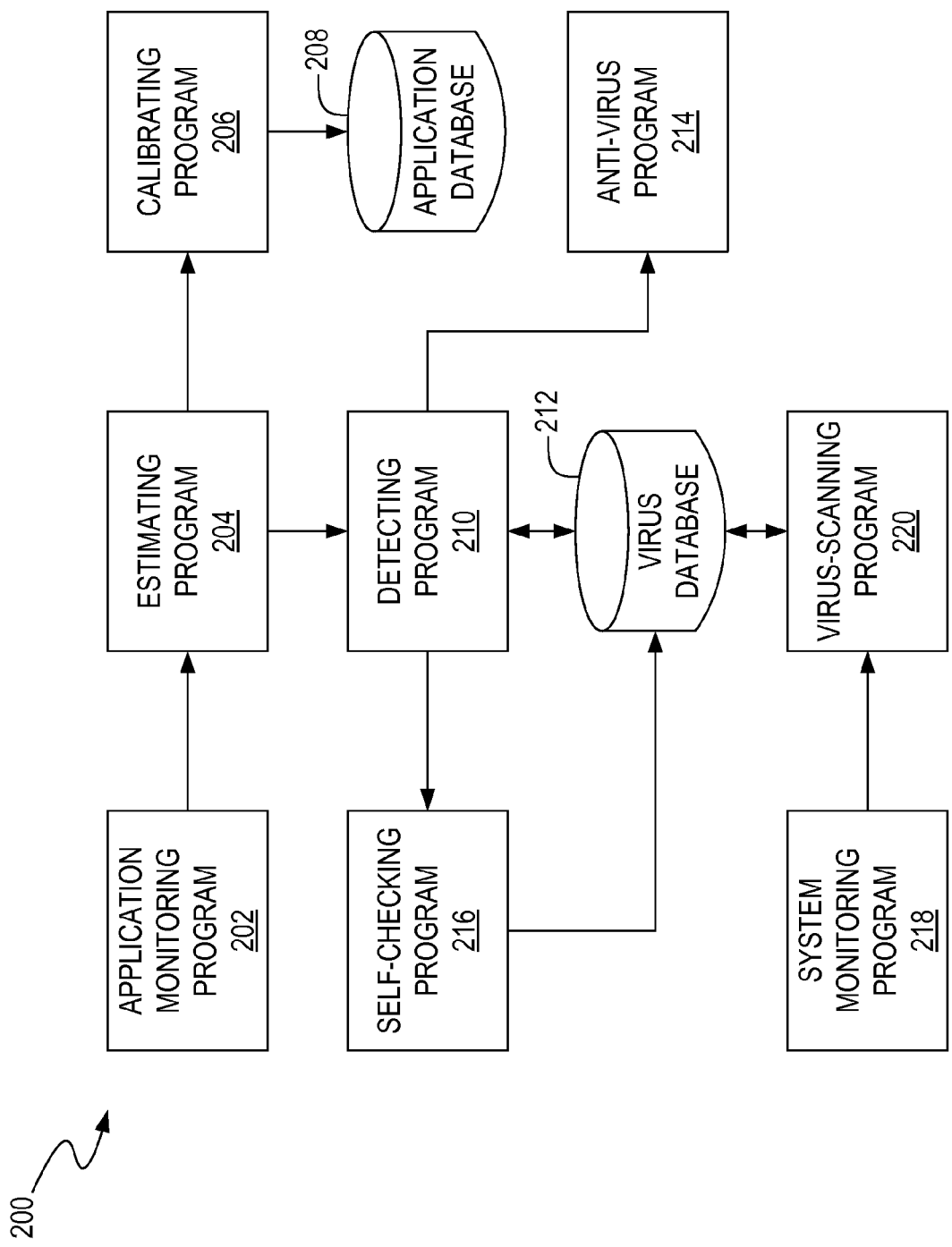
FIG. 2 illustrates a software topology diagram for an electronic device, in accordance with one embodiment of the present invention.

FIG. 2 illustrates a diagram of a software topology 200 for the electronic device 100, in accordance with one embodiment of the present invention. FIG. 2 is described in combination with FIG. 1A and FIG. 1B. In the example of FIG. 2, the software topology 200 includes an application monitoring program 202, an estimating program 204, a calibrating program 206, an application database 208, a detecting program 210, a virus database 212, an anti-virus program 214, a self-checking program 216, a system monitoring program 218, and a virus-scanning program 220. In one embodiment, the programs 202, 204, 206, 210, 214, 216, 218 and 220 are computer-readable instructions reside on a computer-readable medium, e.g., the memory 116, and can be executed by the processor 110 to provide various functions. In one embodiment, the databases 208 and 212 reside on a computer-readable medium, e.g., the memory 116. Under normal circumstances, the power consumption of the programs 202, 204, 206, 210, 214, 216, 218 and 220 are relatively stable and small, and therefore does not affect the estimating of power consumption of other application programs running in the electronic device 100.

The application monitoring program 202, when executed by the processor 110, can detect whether an application program starts to run. The estimating program 204, when executed by the processor 110, can estimate power consumption of the application program, e.g., referred to as program APP1. The application database 208 can store information for one or more application programs. The information includes identities of the application programs, estimated power consumption of the application programs, pre-stored average power consumption of the application programs, etc. The calibrating program 206, when executed by the processor 110, can calculate average power consumption of the program APP1 and update the application database 208 by writing information for the calculated average power consumption into the application database 208. The virus database 212 stores information, e.g., code, for different computer viruses. The detecting program 210, when executed by the processor 110, can access the virus database 212 and check whether the program APP1 contains a computer virus by searching if the program APP1 contains code that is matched to the code of a computer virus in the virus database 212. The anti-virus program 214, when executed by the processor 110, can remove computer viruses. The self-checking program 216, when executed by the processor 110, can compare a current code length of the program APP1 with a pre-stored code length of the program APP1. The pre-stored code length can be stored in the application database 208. The system monitoring program 218, when executed by the processor 110, can detect the power consumption of the electronic device 100 periodically, and detect whether an abnormal condition occurs based on the aforementioned power consumption difference PD0 and the range from $-P_{DTH}$ to $P_{DTH}$. The virus-scanning program 220, when executed by the processor 110, can scan the application programs running in the processor 110, and cooperate with the virus database 212 to check whether an application program running in the processor 110 contains a computer virus.

Figure 3:
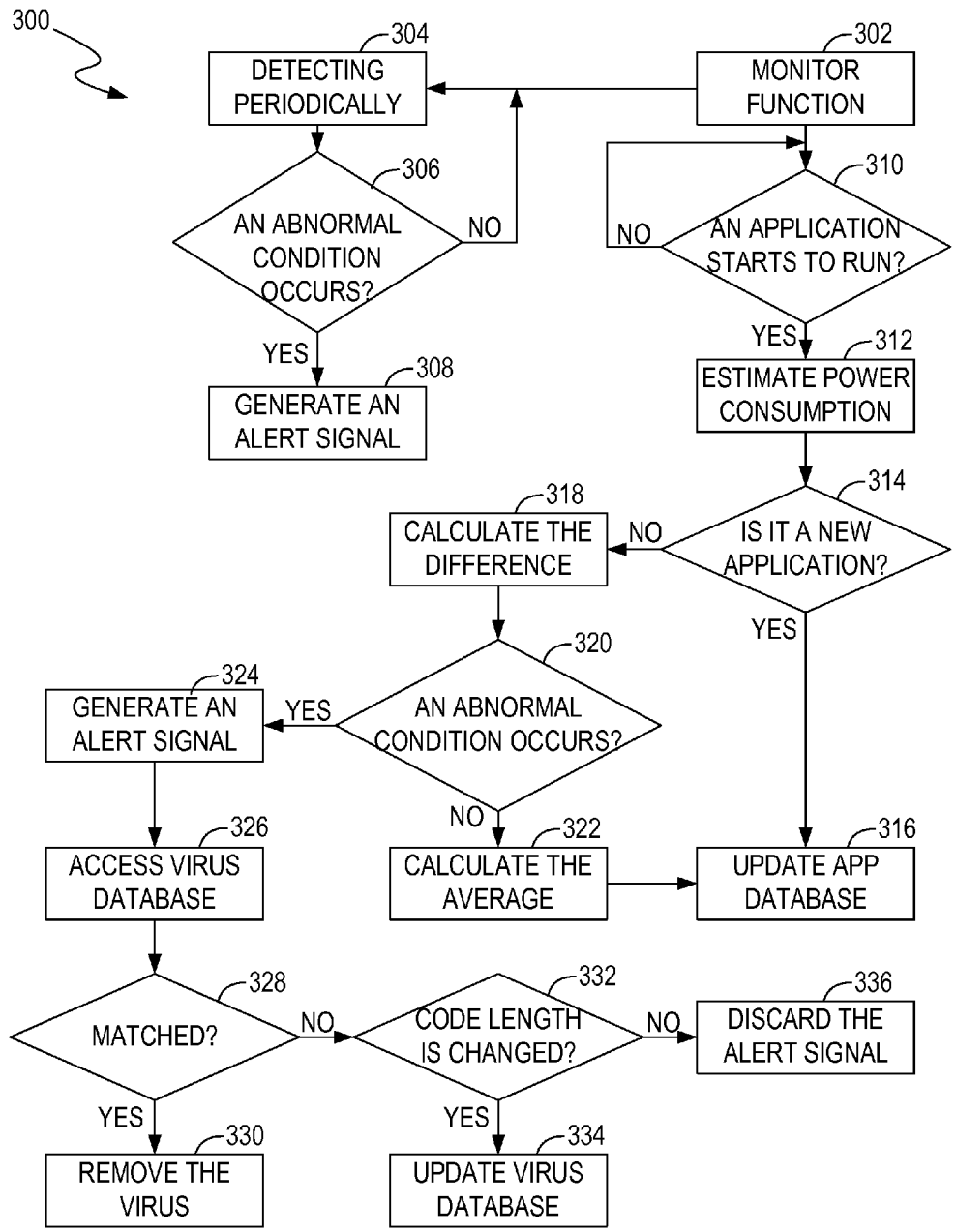
FIG. 3 illustrates a flowchart of examples of operations performed by a processor, in accordance with one embodiment of the present invention.

The operations of the programs 202, 204, 206, 210, 214, 216, 218 and 220 are further described in relation to FIG. 3. FIG. 3 illustrates a flowchart 300 of examples of operations performed by the processor 110, in accordance with one embodiment of the present invention. Although specific steps are disclosed in FIG. 3, such steps are examples. That is, the present invention is well suited to perform various other steps or variations of the steps recited in FIG. 3. In one embodiment, the flowchart 300 is implemented as computer-executable instructions stored in a computer-readable medium, e.g., the memory 116. FIG. 3 is described in combination with FIG. 1A, FIG. 1B and FIG. 2.

In block 302, the processor 110 performs a monitoring function. For example, the processor 110 executes the system monitoring program 218 and the application monitoring program 202.

In block 304, the processor 110 executes the system monitoring program 218 to periodically detect whether an abnormal condition occurs based on the aforementioned power consumption difference PD0 and the range from $-P_{DTH}$ to $P_{DTH}$. If the power consumption difference PD0 is within the range from $-P_{DTH}$ to $P_{DTH}$, the processor 110 determines that the electronic device 100 operates in a normal condition. If the power consumption difference PD0 is outside the range from $-P_{DTH}$ to $P_{DTH}$, the processor 110 determines that an abnormal condition occurs.

In block 306, if the processor 110 detects that an abnormal condition occurs, e.g., the difference PD0 is outside the range from $-P_{DTH}$ to $P_{DTH}$, the flowchart 300 goes to block 308; otherwise, it returns to block 304. In block 308, the processor 110 generates an alert signal to activate the virus-scanning program 220 to scan the application programs running the electronic device 100. If a computer virus is found, the virus-scanning program 220 executes the anti-virus program 214 to remove the computer virus or uninstall the application program infected with the computer virus.

In block 310, the processor 110 executes the application monitoring program 202 to detect whether an application program starts to run, e.g., by accessing a task manger periodically. If an application program APP1 starts to run, the flowchart 300 goes to block 312; otherwise, it returns to block 310.

In block 312, the processor 110 executes the estimating program 204 to estimate power consumption of the program APP1. In block 314, the processor 110 executes the application monitoring program 202 to determine whether the program APP1 is a new application program that runs in the electronic device 100 for the first time. If the program APP1 is a new application program, the flowchart goes to block 316; otherwise, it goes to block 318. In block 316, the processor 110 updates the application database 208 by adding the information for the program APP1 to the application database 208.

In block 318, the processor 110 executes the estimating program 204 to calculate the difference, e.g., referred to as DIF, between the estimated power consumption and a reference $P_R$, e.g., a pre-stored average power consumption of the program APP1 stored in the application database 208. By way of example, the application database 208 stores information for pre-stored average power consumption of one or more application programs including the program APP1. The estimating program 204 obtains information for the pre-stored average power consumption of the program APP1 from the application database 208, and calculates the difference DIF between the estimated power consumption and the pre-stored average power consumption.

In block 320, the processor 110 executes the estimating program 204 to detect whether an abnormal condition occurs by comparing the difference DIF with a predetermined threshold. If the difference DIF is less than the predetermined threshold, the processor 110 determines that the electronic device 100 operates in a normal condition, and the flowchart 300 goes to block 322. If, however, the difference DIF is greater than the predetermined threshold, the processor 110 determines that an abnormal condition occurs, and the flowchart 300 goes to block 324.

In block 322, the processor 110 executes the calibrating program 206 to recalculate the average power consumption of the program APP1 based on the estimated power consumption and the pre-stored average power consumption. In block 316, the processor 110 executes the calibrating program 206 to further update the application database 208 by replacing the pre-stored average power consumption with the recalculated average power consumption.

In block 324, the processor 110 executes the estimating program 204 to provide an alert signal, e.g., an interrupt signal, to the detecting program 210. In block 326, the processor 110 executes the detecting program 210 to access the virus database 212 and compare the code of the program APP1 with code in the virus database 212. In block 328, if the program APP1 contains code that is matched to the code of a computer virus in the virus database 212, the program APP1 is determined as infected with the computer virus, and the flowchart goes to block 330. Otherwise, the flowchart goes to block 332 to perform a self-checking process.

In block 330, the processor 110 executes the detecting program 210 to activate the anti-virus program 214 to remove the computer virus or uninstall the program APP1.

In block 332, the processor 110 executes the self-checking program 216 to compare a current code length of the program APP1 with a pre-stored code length of the program APP1. If the code length is changed, e.g., the current code length is different from the pre-stored code length, then the flowchart 300 goes to block 334. If the code length is unchanged, e.g., the current code length is equal to the pre-stored code length, then the flowchart goes to block 336.

In block 334, the processor 110 executes the self-checking program 216 to determine that a new computer virus is found, and update the virus database 212 to include code of the new computer virus.

In block 336, the processor 110 executes the self-checking program 216 to determine that the electronic device 100 is in the normal condition, and the detecting program 210 discards the alert signal provided by the estimating program 204.

Figure 4:
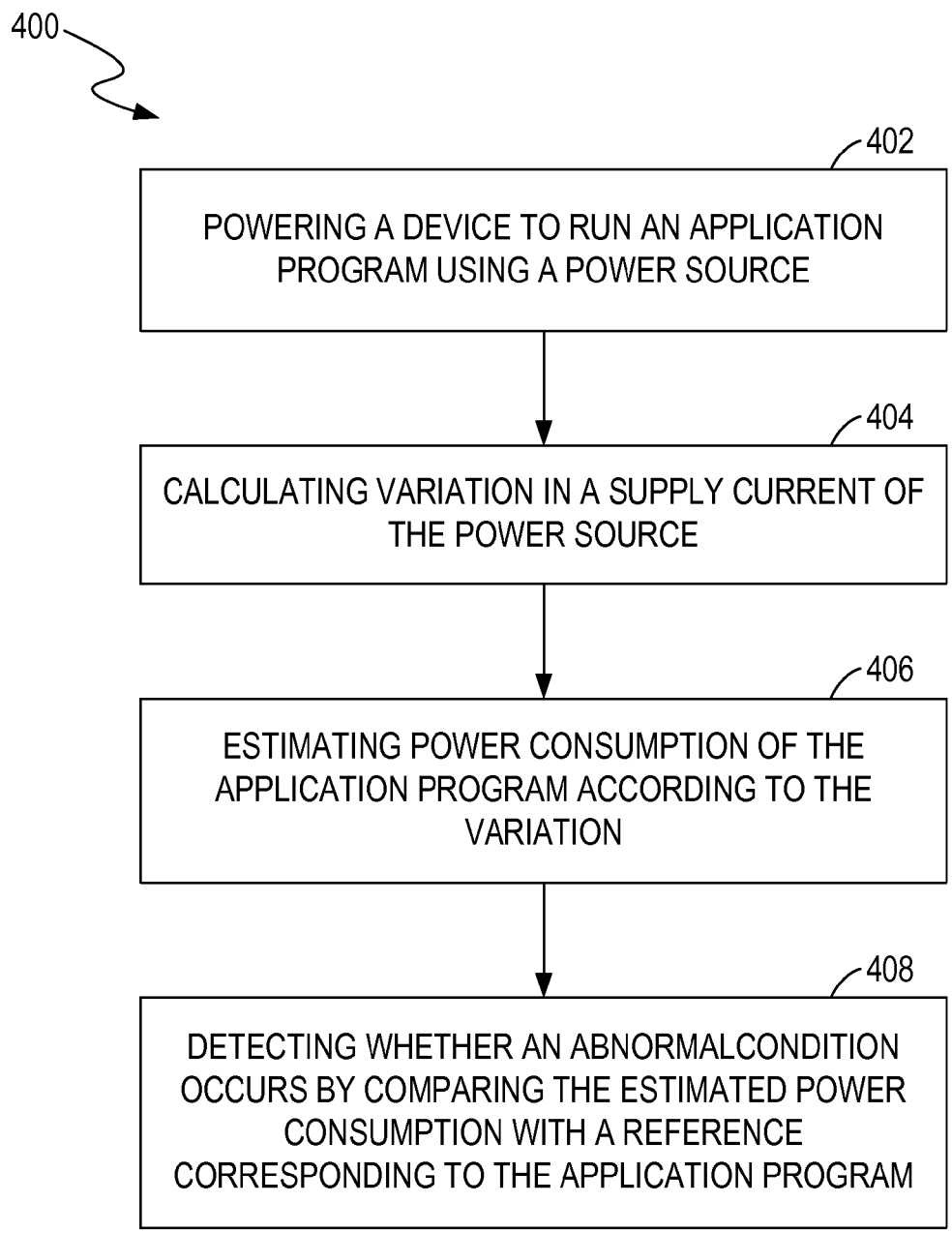
FIG. 4 illustrates a flowchart of examples of operations performed by a detecting system, in accordance with one embodiment of the present invention.

FIG. 4 illustrates a flowchart of examples of operations performed by a detecting system 120 in FIG. 1A, in accordance with one embodiment of the present invention. FIG. 4 is described in combination with FIG. 1A, FIG. 1B, FIG. 2 and FIG. 3. Although specific steps are disclosed in FIG. 4, such steps are examples. That is, the present invention is well suited to perform various other steps or variations of the steps recited in FIG. 4.

In block 402, the power source 102 powers a device, e.g., the electronic device 100, to run an application program, e.g., the program APP1, residing on a computer-readable medium in the device.

In block 404, the processor 110 calculates variation in a supply current, e.g., the supply current $I_{102}$, of the power source 102. By way of example, the supply current $I_{102}$ of the power source 102 can have a first current level when the program APP1 is inactive, and can have a second current level when the program APP1 is active. The variation in the supply current $I_{102}$ of the power source 102 is determined by a difference between the first current level and the second current level.

In block 406, the processor 110 estimates power consumption of the application program, e.g., the program APP1, according to the variation. By way of example, the processor 110 estimates the power consumption of the program APP1 by multiplying the variation in the supply current $I_{102}$ with the voltage of the power source 102.

In block 408, the processor 110 detects whether an abnormal condition occurs by comparing the estimated power consumption with a reference $P_R$ corresponding to the application program. By way of example, if a difference between the estimated power consumption and the reference $P_R$ is greater than a predetermined threshold, the processor 110 provides an alert signal indicating that an abnormal condition occurs. In one embodiment, the abnormal condition occurs if an application program is infected with a computer virus or other types of malicious software.

Accordingly, the detecting system calculates power consumption of an application program running in an electronic device by calculating variation in a supply current that is drawn by the electronic device. The detecting system detects whether an abnormal condition occurs by comparing the estimated power consumption consumed by the application program with a reference corresponding to the application program. The detecting system can be used in various applications such as desktops, laptops, smart phones, palmtops, tablet computers, etc.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A detecting system comprising:
   a sense terminal that receives an indicative signal indicative of a supply current, wherein said supply current is provided to power a device to run a first application program residing on a computer-readable medium in said device; and
   detecting circuitry that is coupled to said sense terminal, that calculates variation in said supply current based on said indicative signal, that estimates power consumption of said first application program according to said variation, and that detects whether an abnormal condition occurs by comparing the estimated power consumption with a reference indicative of average power consumption of said first application program,
   wherein said detecting circuitry determines that said abnormal condition occurs to said first application program if a difference between said estimated power consumption and said reference is greater than a predetermined threshold, and determines that said first application program is in a normal condition if a difference between said estimated power consumption and said reference is less than said predetermined threshold, wherein said detecting circuitry checks whether said first application program contains a computer virus if said detecting circuitry detects that said abnormal condition occurs to said first application program, and wherein said detecting circuitry updates said reference based on said estimated power consumption if said detecting circuitry detects that said first application program is in said normal condition.

2. The detecting system as claimed in claim 1, wherein said detecting circuitry comprises a monitor that is coupled to said sense terminal, that monitors said supply current based on said indicative signal, and that stores information indicative of said supply current in a storage unit.

3. The detecting system as claimed in claim 2, wherein said detecting circuitry further comprises a processor that is coupled to said monitor and said sense terminal, that receives said information from said storage unit, that calculates said variation in said supply current based on said information, that estimates said power consumption of said first application program according to said variation, and that detects whether said abnormal condition occurs by comparing said estimated power consumption with said reference.

4. The detecting system as claimed in claim 1, wherein said device comprises an operating system that supports said first application program.

5. The detecting system as claimed in claim 1, wherein said detecting circuitry calculates remaining electric energy of a power source for providing said supply current, detects whether said power source can power said device to run a second application program residing on said computer-readable medium based on said remaining electric energy, and estimates a time duration for running said second application program if said device can run said second application program.

6. The detecting system as claimed in claim 1, wherein said detecting circuitry is operable for calculating remaining electric energy of a power source that provides said supply current, converting said remaining electric energy from Joule to Calorie, and providing information to a display screen such that said display screen displays said remaining electric energy in the unit of Calorie.

7. The detecting system as claimed in claim 1, wherein if said detecting circuitry detects that said abnormal condition occurs to said first application program, then said detecting circuitry executes a detecting program residing on said computer-readable medium to access a virus database and to compare code of said first application program with code in said virus database.

8. The detecting system as claimed in claim 7, wherein if said first application program does not contain code that is matched to code in said virus database, then said detecting circuitry executes a checking program residing on said computer-readable medium to check whether said first application program contains a computer virus by comparing a current code length of said first application program with a pre-stored code length of said first application program.

9. The detecting system as claimed in claim 8, wherein if said current code length is different from said pre-stored code length, then said detecting circuitry determines that a new computer virus is found, and updates said virus database to include code of said new computer virus.

10. The detecting system as claimed in claim 1, further comprising:
a sense component that provides said indicative signal when said supply current flows through said sense component, wherein said indicative signal comprises a voltage across said sense component.

11. A method for detecting a status of a first application program residing on a computer-readable medium in a device, said method comprising:
powering said device to run said first application program using a supply current;
calculating variation in said supply current;
estimating power consumption of said first application program according to said variation;
detecting whether an abnormal condition occurs by comparing the estimated power consumption with a reference indicative of average power consumption of said first application program;
determining that said abnormal condition occurs to said first application program if a difference between said estimated power consumption and said reference is greater than a predetermined threshold;
determining that said first application program is in a normal condition if a difference between said estimated power consumption and said reference is less than said predetermined threshold;
checking whether said first application program contains a computer virus if it is determined that said abnormal condition occurs to said first application program; and
updating said reference based on said estimated power consumption if it is determined that said first application program is in said normal condition.

12. The method as claimed in claim 11, said method further comprising:
monitoring said supply current based on a voltage across a sense component when said supply current flows through said sense component; and
calculating said variation in said supply current based on said voltage.

13. The method as claimed in claim 11, said method further comprising:
calculating remaining electric energy of a power source that provides said supply current;
detecting whether said power source can power said device to run a second application program residing on said computer-readable medium based on said remaining electric energy; and
estimating a time duration for running said second application program if said device can run said second application program.

14. A detecting system comprising:
a processor; and
a memory coupled to said processor, said memory comprising computer-readable instructions that, when executed by said processor, cause said processor to receive information indicative of a supply current, to calculate variation in said supply current based on said information, to estimate power consumption of a first application program residing on said memory according to said variation, and to detect whether an abnormal condition occurs by comparing the estimated power consumption with a reference indicative of average power consumption of said first application program, wherein said supply current is provided to power a device to run said first application program,
wherein said computer-readable instructions, when executed by said processor, cause said processor to determine that said abnormal condition occurs to said first application program if a difference between said estimated power consumption and said reference is greater than a predetermined threshold, cause said processor to determine that said first application program is in a normal condition if a difference between said estimated power consumption and said reference is less than said predetermined threshold, cause said processor to check whether said first application program contains a computer virus if said processor detects that said abnormal condition occurs to said first application program, and cause said processor to update said reference based on said estimated power consumption if said processor detects that said first application program is in said normal condition.

15. The detecting system as claimed in claim 14, wherein said computer-readable instructions, when executed by said processor, cause said processor to calculate remaining electric energy of a power source that provides said supply current and detect whether said power source can power said device to run a second application program residing on said memory based on said remaining electric energy, and cause said processor to estimate a time duration for running said second application program if said device can run said second application program.

16. The detecting system as claimed in claim 14, further comprising:
   a sensor component that provides an indicative signal indicative of said supply current when said supply current flows through said sensor component; and
   a monitor that is coupled to said sensor component and converts said indicative signal to said information.

* * * * *